United States Patent [19]

Braun

[11] Patent Number: 5,369,442
[45] Date of Patent: Nov. 29, 1994

[54] METHOD FOR PICTURE-IN-PICTURE INSERTION AND DEVICE FOR PERFORMING THE METHOD

[75] Inventor: Bodo Braun, Höhenkirchen-Siegertsbrunn, Germany

[73] Assignee: Siemens Aktiengesellschaft, Munich, Germany

[21] Appl. No.: 748,980

[22] Filed: Aug. 23, 1991

[30] Foreign Application Priority Data

Aug. 23, 1990 [XH] Hague Agreement ......... 90116186.9

[51] Int. Cl.⁵ .......................................... H04N 5/272
[52] U.S. Cl. ..................................... 348/567; 348/715
[58] Field of Search ............... 358/22, 183, 181, 182; 348/565, 567, 566, 568, 714, 715, 718; H04N 5/262, 5/265, 5/272, 5/275

[56] References Cited

U.S. PATENT DOCUMENTS

| | | | |
|---|---|---|---|
| 4,665,438 | 5/1987 | Miron | 358/183 |
| 4,724,487 | 2/1988 | Casey . | |
| 4,750,038 | 6/1988 | Welles | 358/183 |
| 4,761,688 | 8/1988 | Hakamada | 358/22 |
| 4,987,493 | 1/1991 | Canfield | 358/183 |
| 4,991,013 | 2/1991 | Kobayashi | 358/22 |
| 5,021,887 | 6/1991 | Park | 348/567 |
| 5,040,067 | 8/1991 | Yamazaki | 348/567 |
| 5,043,811 | 8/1991 | Yasuhiro | 358/22 |
| 5,111,297 | 5/1992 | Tsuji | 358/183 |
| 5,144,437 | 9/1992 | Miyauchi | 358/183 |

FOREIGN PATENT DOCUMENTS

| | | |
|---|---|---|
| 0288152 | 10/1988 | European Pat. Off. . |
| 0357813 | 3/1990 | European Pat. Off. . |
| 2413839 | 9/1975 | Germany . |
| 3804705 | 8/1988 | Germany . |
| 3690375 | 8/1989 | Germany . |
| 2187360 | 9/1987 | United Kingdom . |

OTHER PUBLICATIONS

IEEE Transactions on Consumer Electronics, Feb. 1979, pp. 152–159; Masuda: "Fully Digitalized Color Picture in Picture Television System".

IEEE Transactions on Consumer Electronics, Aug. 1987; pp. 230–238; Masuda et al: "Picture in Picture System with a Digital Memory for VCRS".

*Primary Examiner*—Mark R. Powell
*Assistant Examiner*—Chris Grant
*Attorney, Agent, or Firm*—Herbert L. Lerner; Laurence A. Greenberg

[57] ABSTRACT

In a method for picture-in-picture insertion, successive frames of a small picture to be inserted into a main picture having successive frames are alternatingly written frame-wise into a memory region of a memory device. A decision signal is generated at a beginning of a display of the main picture, for deciding from which of the two memory regions a stored frame of the small picture is to be read out. Frames of the small picture are read out from whichever memory region enables joint-line-free insertion of the small picture into the main picture.

18 Claims, 8 Drawing Sheets

METHOD FOR PICTURE-IN-PICTURE INSERTION AND DEVICE FOR PERFORMING THE METHOD

SPECIFICATION

The invention relates to a method for inset-picture or picture-in-picture keying or insertion, in which successive frames of a small picture to be inserted into a main picture having successive frames are alternatingly written or inscribed frame-wise into one of two memory regions of a memory device and read out again from whichever memory region enables joint-line-free insertion of the small picture into the main picture. The invention also relates to an apparatus for performing the method having a screen for displaying a main picture into which at least one small picture can be inserted, a first video source for displaying the main picture with first frames that succeed one another in alternation and have first synchronizing signals, a second video source for displaying the small picture having second frames that succeed one another in alternation and have second synchronizing signals, a memory device having two memory regions into which the successive frames of the small picture can be written by means of a write-in device, one memory region being provided for write-in of the first frames and the other memory region being provided for write-in of the second frames of the small picture, a readout device for reading out the frames of the small picture that are stored in the memory regions, and an inserting device for joint-line-free insertion of the frames to be read out of the small picture into the main picture.

When picture memories are used for inset-picture or picture-in-picture keying, mixing, inserting or superimposition, the picture to be inserted, which is generally a small image, is flawed by the appearance of what is known as a joint line such interference produces an undesirable seam in the picture when the picture contents are moved horizontally. As is discussed below in the description of FIG. 1 which uses a bicycle as an example, a small picture that is inserted into a large picture has that kind of joint line, assuming that the bicycle shown is moving horizontally from left to right.

The cause of such a joint line is that the picture information for the small picture is read out of the memory apparatus, while the contents of the memory apparatus are being rewritten with new picture data at that time. Since the readout speed is higher than the rewriting speed, new and old picture data both are present in the memory apparatus, and when read out, they produce two separate picture parts which are offset from one another and separated by the joint line.

Various methods have become known for avoiding that kind of joint line in picture-in-picture insertion. For instance, in IEEE Transactions on Consumer Electronics, Vol. CE-33, No. 3, August 1987, pp. 152-159, it is proposed that four memory regions be provided in the memory apparatus to eliminate the joint line in the small picture. With cyclic repetition of the memory region sequence, such regions are written in with one of the successive frames or half-frames of the small picture in alternation. The readout of the pictures takes place from whatever memory region is not being written in at that time. That method, which is known as the alternating buffer mode, also works if there are only three memory regions, as is shown in FIG. 3 of German Published, Non-Prosecuted Application DE 38 04 705 A1, corresponding to U.S. application Ser. No. 015,407, filed Feb. 17, 1987. The essential point is merely that the write-in or inscription and the readout of the picture data for the small picture takes place in alternation from the three or four memory regions, and a temporal overlap of reading and write-in or inscription is prevented.

German Patent DE 36 90 375 C2, page 3, lines 10-20, describes preventing the joint line by using only two memory regions. Through the use of an intermediate line control circuit, the memory region that enables displaying of the small picture without a joint line is selected for readout of the picture data for the small picture. No further details on that point can be found in that publication. Instead, a different way of making do with only two memory regions is described in detail. That is, a decision is made as to which of the two memory regions the picture signal for the small picture should be written in.

It is accordingly an object of the invention to provide a method and apparatus for interference-free inset-picture or picture-in-picture insertion, which overcome the hereinafore-mentioned disadvantages of the heretofore-known methods and devices of this general type, and with which reliable and simple insertion of the small picture into the main picture without a joint line is possible, regardless of the order in which the two memory regions are written with picture signals for the small picture.

With the foregoing and other objects in view there is provided, in accordance with the invention, in a method for picture-in-picture or inset-picture keying, mixing, inserting or superimposition, in which a small picture having successive frames is to be inserted into a main picture having successive frames, the improvement which comprises alternatingly writing or inscribing the successive frames of the small picture frame-wise into one of two memory regions of a memory device, generating a decision signal at a beginning of a display of the main picture, for deciding from which of the two memory regions a stored frame of the small picture is to be read out, and reading out successive frames of the small picture from whichever memory region enables joint-line-free insertion of the small picture into the main picture.

In accordance with another mode of the invention, there is provided a method which comprises determining the beginning of the display of the main picture by the beginning of a first picture line visible on a screen.

In accordance with a further mode of the invention, there is provided a method which comprises generating the decision signal as a function of synchronizing signals of the small picture and the main picture, and as a function of a location of the small picture in the main picture.

In accordance with an added mode of the invention, there is provided a method which comprises generating the decision signal as a function of a signal being dependent on a size of the small picture to be inserted.

If a memory apparatus is provided having a capacity for storing one entire frame or one half-frame of the main picture (for instance, 288 lines times 720 dots), and if the first memory region is located in the memory part provided for the left half of the picture and the second memory region is located in the memory part provided for the right half of the picture in the memory apparatus, then synchronous readout of the entire picture memory and thus picture-in-picture insertion can be accomplished with the synchronizing frame of the main picture. Moreover, the small picture to be inserted can be inserted at arbitrary points in the main picture, for instance by means of marking features written in the memory apparatus. Regarding this point, reference is made to Published European Application No. 0 357 813 A1. The prerequisite for this is that in the horizontal direction, the small picture to be inserted is read out from either the first or the second memory region and then displayed. Moreover, with the method of the invention it is possible to write into the memory apparatus and display not only a small picture with a moving picture content to be inserted but also other small still pictures to be inserted into the main picture. This will be described in even further detail below in the description of the drawings.

Upon readout of the picture data from one of the two memory regions it may happen that the small picture to be inserted has undesirable interlace inversions. Therefore, in accordance with an additional mode of the invention, there is provided a method which comprises carrying out a line correction in the small picture if an interlace inversion is detected in the small picture to be inserted.

In accordance with yet another mode of the invention, there is provided a method which comprises dividing the successive frames of the small picture and the main picture into odd and even half-frames.

In accordance with yet a further mode of the invention, there is provided a method which comprises displaying the small picture and the main picture at a frame repetition frequency being twice that of an original frame repetition frequency, in other words at 100 Hz or 120 Hz, predetermining a frame scanning order for the main picture, generating an identification signal depending on the scanning order of the main picture, that is whether it is AABB or ABAB, where A and B each stand for one frame or half-frame, for generating or identifying an instantaneous scanning location or position of the main picture and for generating a scanning correction signal as a function thereof, and tripping a scanning correction for a frame to be read out from the selected memory region with the scanning correction signal.

In accordance with yet an added mode of the invention, there is provided a method which comprises carrying out the scanning correction of the small picture by interpolation or by displacement of picture lines.

With the objects of the invention in view, there is also provided an apparatus for picture-in-picture or inset-picture keying, mixing, inserting or superimposition, comprising a screen for displaying a main picture and at least one small picture to be inserted into the main picture, a first video source for displaying the main picture with first frames that succeed one another in alternation and have first synchronizing signals, a second video source for displaying the small picture with second frames that succeed one another in alternation and have second synchronizing signals, a memory device having one memory region for write-in or inscription of the first frames and another memory region for write-in of the second frames of the small picture, a write-in device connected to the memory device for writing the successive frames of the small picture into the memory regions, a readout device connected to the memory device for reading out the frames of the small picture stored in the memory regions, an inserting device connected between the memory device and the screen for joint-line-free insertion of the frames to be read out of the small picture into the main picture, and a decision device connected to the readout device for generating a decision signal to be supplied to the readout device for deciding at a beginning of a display of the main picture from which of the memory regions a stored frame of the small picture for insertion into the main picture is to be read out.

In accordance with another feature of the invention, the decision device has a first input terminal for receiving the synchronizing signals of the main picture, a second input terminal for receiving the synchronizing signals of the small picture, a third input terminal for receiving a signal indicating a location of the small picture in the main picture, another device connected to the first input terminal having an output for supplying another signal indicating a beginning of a first picture line of the main picture being visible on the screen, and a logic array connected to the output of the other device for furnishing the decision signal as a function of the other signal.

In accordance with a further feature of the invention, the logic array includes first and second D flip-flops each having a data input, a clock input and a Q output, the data input of the first D flip-flop receives a signal indicating whether a frame of the small picture having been just written into the memory device is a first or a second frame, the clock input of the first D flip-flop receives a predeterminable enable signal being generated as a function of the location of the small picture to be inserted into the main picture, the Q output of the first D flip-flop is connected to the data input of the second D flip-flop, the clock input of the second D flip-flop receives the other signal, and the Q output of the second D flip-flop supplies the decision signal.

In accordance with an added feature of the invention, the decision device has an enable instant decoder connected to the clock input of the first D flip-flop for generating and supplying the enable signal, the enable instant decoder having means for furnishing one enable signal for various regions of possible locations of the small picture in the main picture.

In accordance with an additional feature of the invention, there is provided a correction device connected between the inserting device and the memory device for correcting interlace inversions arising in the small picture to be inserted.

In accordance with yet another feature of the invention, the correction device has means for supplying the decision device with a first frame of the small picture being intended for insertion into a first or second frame of the main picture, and a second frame of the small picture being intended for insertion into a second frame of the main picture in unchanged form, and a second frame of the small picture being intended for insertion into a first frame of the main picture in a form being offset downward by one picture line.

In accordance with yet a further feature of the invention, the correction device has means for supplying the decision device with a second frame of the small picture being intended for insertion into a first or second frame of the main picture, and a first frame of the small picture being intended for insertion into a first frame of the main picture in unchanged form, and a first frame of the small picture being intended for insertion into a second frame of the main picture in a form being offset upward by one-half of a picture line.

In accordance with yet an added feature of the invention, the memory device has a memory region with means for storing more than two small pictures, and in particular a memory region with means for storing a main picture.

In accordance with a concomitant feature of the invention, there are provided means for writing marking identifications into the memory device for defining the location of the memory region for the small picture inside the memory region for the main picture.

Other features which are considered as characteristic for the invention are set forth in the appended claims.

Although the invention is illustrated and described herein as embodied in a method for inset-picture or picture-in-picture insertion and a device for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 2 is a simplified block circuit diagram of an apparatus according to the invention for joint-line-free insertion of a small picture into a main picture, with two memory regions and a decision device for deciding which of the two memory regions the small picture is to be read out from;

The invention will be described in detail below in conjunction with fourteen drawing figures, by taking television signals that are received by the intermediate-line method as an example. Each television picture is divided into two half frames that contain odd and even lines and are transmitted at a 50 Hz or 60 Hz half-frame frequency. However, the invention can also be used with an apparatus that processes full frames instead of half-frames and/or has no interlaces. An example of this is video sources such as personal computers or certain video cassette recorders.

Figure 1:
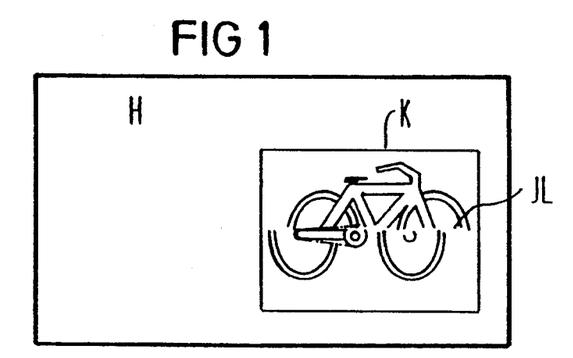
FIG. 1 is an elevational view of a screen with a small picture having a joint line and being inserted into a main picture.

Referring now to the figures of the drawing in detail and first, particularly, to FIG. 1 thereof, there is seen a small picture K being inserted into a main picture H and having an undesirable joint line or seam when the contents of the picture, in this case a bicycle, are moving horizontally. It is such a joint line that is to be avoided according to the purpose of the present invention. The small picture K has two picture parts being offset from one another and separated by a joint line JL.

Figure 2:
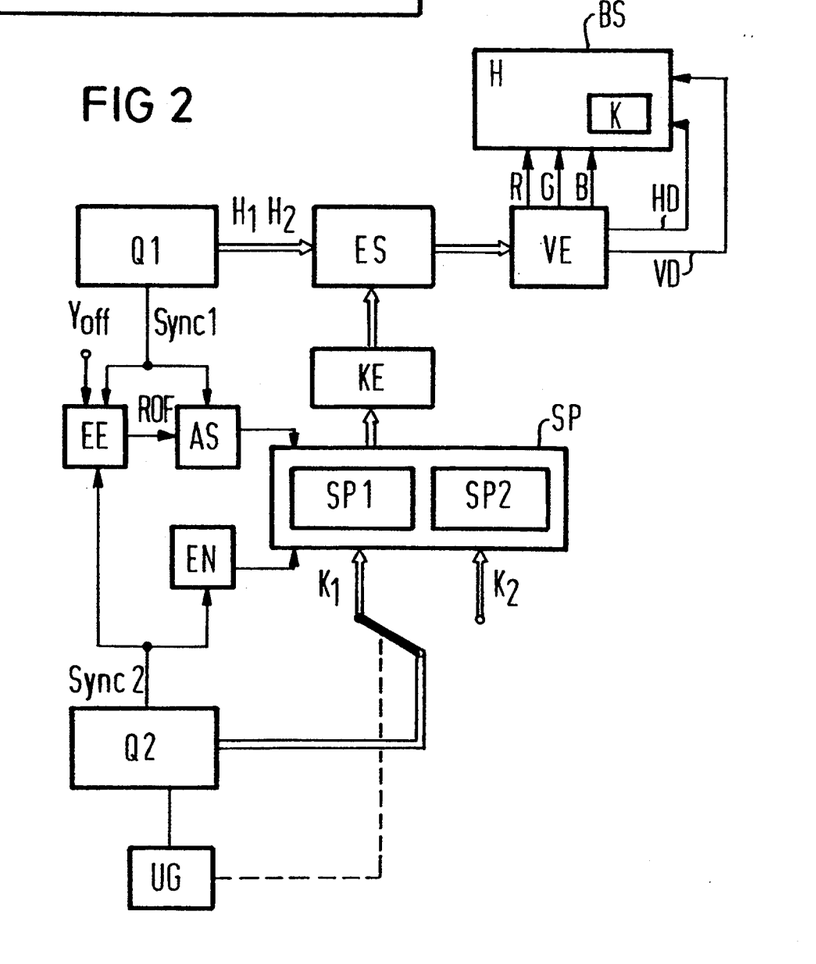

FIG. 2 shows the basic layout of an apparatus according to the invention for carrying out joint-line-free inset-picture or picture-in-picture keying, mixing, inserting or superimposition, which is shown by way of example in a television set having a screen BS, on which the small picture K can be inserted into the main or large picture H. The apparatus has a first video source Q1 and a second video source Q2. The first video source Q1 furnishes the main picture H with first half-frames $H_1$, $H_2$ that succeed one another in alternation and have first synchronizing signals Sync 1. The second video source furnishes half-frames $K_1$, $K_2$ for the small picture K that succeed one another in alternation and have second synchronizing signals Sync 2. A memory device SP having two memory regions SP1, SP2 is also provided. The successive half-frames $K_1$, $K_2$ of the small picture K can be written or inscribed into these memory regions by means of a write-in or inscription device EN. The odd half-frames $K_1$ are written in or entered into one memory region SP1, and the even half-frames $K_2$ of the small picture are written in or entered into the other memory region SP2. The apparatus also has a readout device AS for reading out the half-frames $K_1$, $K_2$ stored in the memory regions SP1, SP2, and an inserting device ES for the joint-line-free insertion of these half-frames $K_1$, $K_2$. The readout device AS can be supplied with a decision signal ROF from a decision device EE. When the representation of the main picture H begins, this decision signal ROF determines which of the two memory regions SP1, SP2 a stored half-frame $K_1$, $K_2$ of the small picture K is to be read out from in order to be inserted into the main picture H.

The write-in, inscription or entry of the successive half-frames $K_1$, $K_2$ into the memory regions SP1, SP2 is controlled through a detector device UG connected to the second video source Q2. This detector device decides whether a just-received half-frame $K_1$, $K_2$ from the second video source Q2 is an odd half-frame $K_1$ or an even half-frame $K_2$. A correction device KE for correcting interlace inversions that occur in the small picture K to be inserted in is also provided between the memory device SP and the inserting device ES. This correction device KE can naturally be omitted if one of the two video sources Q2, Q1 furnishes video signals other than those formed by the interlace method. Interlace inversions occurring in the picture-in-picture insertion can occur in the simplest case by means of address modification of the memory addresses upon readout of the half-frames $K_1$ or $K_2$ from the memory device SP. The half-frames $K_1$ or $K_2$ of the small picture K, thus possibly corrected, reach the inserting device ES, where they are inserted into the even and odd half-frames $H_1$, $H_2$ of the main picture and then reach a video processing device VE for further processing of the picture-in-picture video signals. In general, the video processing device VE will be a video signal processor that has a video amplifier and a deflection circuit, for supplying the picture tube of the television set with RGB signals, for instance, and necessary deflection currents HD, VD for that purpose.

Figure 3:
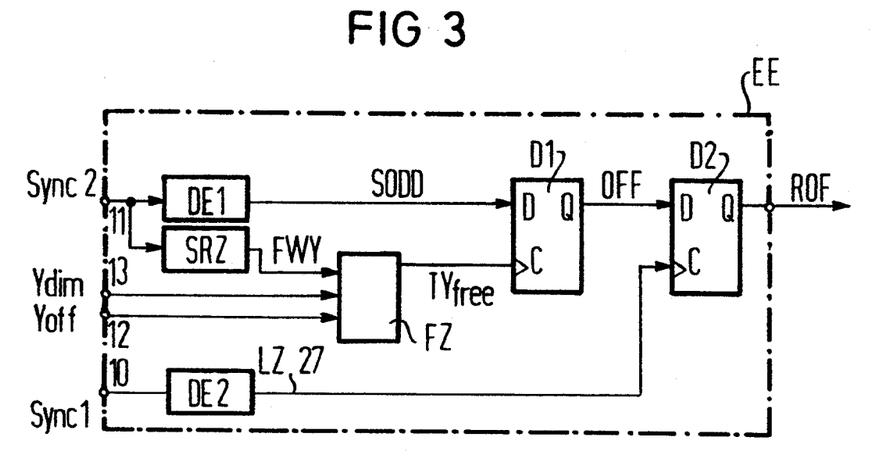
FIG. 3 is a detailed block circuit configuration of the decision device of FIG. 2.

FIG. 3 shows a detailed circuit configuration of the decision device EE, which has a function that will be described in detail in conjunction with the following FIGS. 4, 5 and 6. The decision device EE has a first input terminal 10 for applying the synchronizing signal Sync 1 of the first video source Q1, a second input terminal 11 for applying the synchronizing signal Sync 2 of the second video source Q2, a third input terminal 12 for a signal $Y_{off}$ which indicates the location of the small picture K in the main picture H, and in this exemplary embodiment a fourth input terminal 13 for a signal $Y_{dim}$, which is selected as a function of the size of the small picture to be inserted. The first input terminal 10 for the synchronizing signal Sync 1 of the main picture H is connected to a detector device DE2, at the output of which a signal LZ 27 can be picked up that indicates the beginning of a first picture line of the main picture H that is visible on a screen. The decision device EE also has a logic array that furnishes the decision signal ROF as a function of this signal LZ 27. The logic array has a first D flip-flop D1, at a Q output Q of which a signal OFF can be picked up that is supplied to a data input D of a second D flip-flop D2. The second D flip-flop D2 has a clock input C to which the signal LZ 27 is supplied. The decision signal ROF, which decides from which of the two memory regions SP1, SP2 a stored half-frame $K_1$, $K_2$ is to be read out, can be picked up at a Q output Q of this second D flip-flop D2.

A data input D of the first D flip-flop D1 receives a signal SODD, which indicates whether a half-frame of the small picture K to be written in the memory device SP at that time is an odd or an even half-frame. The clock input C of this first D flip-flop D1 receives a predeterminable enable signal $TY_{free}$, which can be picked up at an output of an enable instant detector FZ. The enable instant detector FZ is connected to the input terminals 12 and 13 of the decision device EE and additionally receives a signal FWY, which can be picked up at an output of a writing frame counter SRZ connected to the second input terminal 11. Also connected to the second input terminal 11 of the decision device EE is a further detector device DE1 having an output which supplies the signal SODD that indicates whether a half-frame of the small picture just written in the memory device is an odd or an even half-frame. As will be explained in further detail below, the enable instant detector FZ serves to generate the enable signal $TY_{free}$, and for various regions of possible locations of the small picture K in the main picture H, only one enable signal $TY_{free}$ is furnished at a time.

Through the use of FIG. 4, the method according to the invention will be explained in terms of so-called line index diagrams for the write-in or inscription and reading mode of the memory device. The line numbers of the odd and even half-frames $K_1$, $K_2$ of the small picture that are to be written in and read out again from the memory regions SP1, SP2 are plotted on the ordinate, over time t, in terms of coordinates of the main picture. For the sake of simplicity, it is assumed that each half-frame includes 312 lines (instead of 312.5), and the first visible line on the screen is formed by the 27th line of a half-frame.

Figure 4:
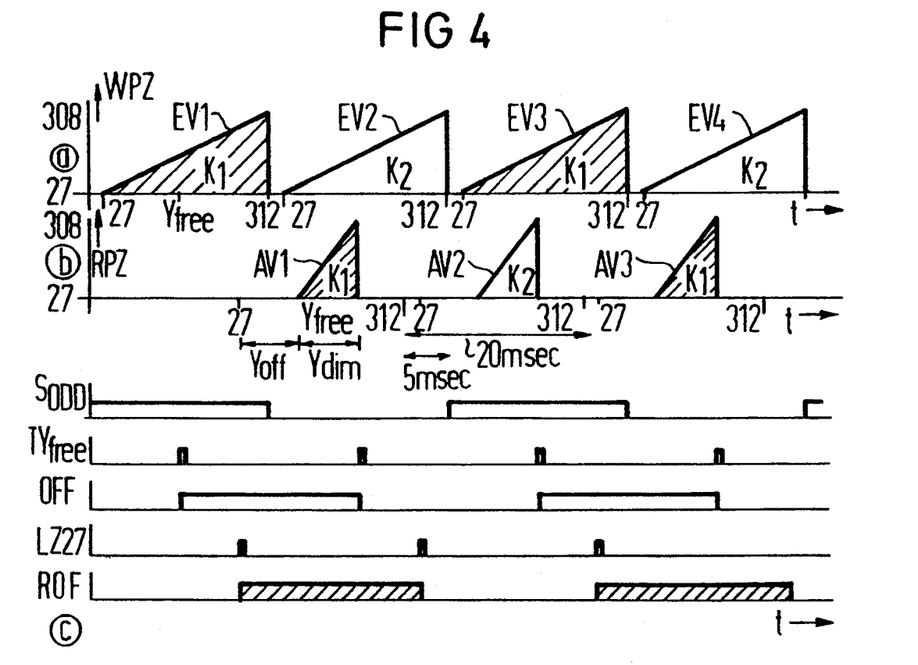
FIG. 4 is a view of a first exemplary embodiment of a line index diagram with readout and write-in or inscription vectors, which identify the readout and write-in or inscription of half frames into two memory regions.

A portion a of FIG. 4 shows the course over time of the write-in or inscription of the half-frames $K_1$, $K_2$ of the small picture into the memory regions SP1, SP2. First, the first odd half-frame $K_1$ is written into the first memory region SP1, and then the first even half-frame $K_2$ is written in the second memory region SP2. Subsequently, the second odd half-frame $K_1$ is written in the first memory region SP1, and the second even half-frame $K_2$ is written in the second memory region SP2, and so forth. The write-in or inscription of these half-frames $K_1$, $K_2$ is effected in accordance with synchronizing signals of the second video source Q2 that makes the second small picture available. The abscissa in the portion a of FIG. 4 shows the line number of the lines of the half-frames $K_1$, $K_2$ currently written in the first and second memory regions SP1, SP2. The rising straight lines in the portion a of FIG. 4 will be referred to below as write-in or inscription vectors EV1, EV2, EV3 and EV4.

A portion b of FIG. 4 shows the course over time for the condition of readout of the memorized half-frames $K_1$, $K_2$. It is initially still undecided from which of the two memory regions SP1, SP2 a half-frame is to be read out. The line numbers of the main picture are again plotted on the ordinate over the time t, while the abscissa indicates the lines of the first or second memory region SP1, SP2 from which the memorized half-frame is just then being read out in other words the line indices of the written in small picture. If it is assumed that the half-frame to be inserted, having a size $Y_{dim}$, is to be inserted at a location $Y_{off}$ of the main picture, then the result is the line index diagram shown in the portion b of FIG. 4, whenever it is true that the small picture to be inserted is 94 lines high, that is $Y_{dim}=94$, and is to be inserted into the main picture from the 104th line on, that is $Y_{off}=104$. The various rising straight lines in the portion b of FIG. 4 are referred to below as readout vectors AV1, AV2, AV3. An offset in time of lines 27-312 between the portions a and b of FIG. 4 is based on the fact that the first and second video sources Q1, Q2 have a phase displacement in terms of their synchronizing signals.

Through the use of the decision device EE, under the write-in or inscription and reading conditions shown in the portions a and b of FIG. 4, the aforementioned signals SODD, $TY_{free}$, LZ 27 and the decision signal ROF are generated. The signal OFF which is also present at the output of the first D flip-flop D1, has a clock period of 40 ms, which changes its polarity every 20 ms upon the appearance of the signal $TY_{free}$, and indicates whether the half-frame of the small picture written in the last instant $TY_{free}$ in the first memory region SP1 or second memory region SP2 is an odd half-frame $K_1$ or an even half-frame $K_2$. Finally, the decision signal ROF that can be picked up at the output of the decision device EE determines from which of the two memory regions SP1 or SP2 a memorized half-frame for inset-picture or picture-in-picture insertion is to be taken.

Through the use of the exemplary embodiment of the decision device EE of FIG. 3, with a decision signal ROF=1, the previously stored odd half-frame $K_1$ can be read out of the first memory device SP1, and correspondingly the even half-frame stored in the second memory region SP2 can be read out at a decision signal ROF=0. According to the portion c of FIG. 4, this means that for inserting the small picture into the main picture in such a manner as to be free of a joint line, a beginning must be made by a readout of the first memory region SP1. Since the decision signal ROF is already present at the beginning of the signal LZ 27, it is already decided which of the two memory regions SP1, SP2 has to be activated for readout at the beginning of the first picture line visible on the screen. A definitive factor in satisfactory operation of the decision device EE of FIG. 3 is the correct definition of the instant at which the enable signal $TY_{free}$ has to furnish a pulse. The signal OFF is in fact defined by the enable signal $TY_{free}$. The enable signal $TY_{free}$, which should have a pulse at the beginning of a line $Y_{free}$ in the vertical synchronizing frame of the second video source Q2, depends on the position $Y_{off}$ of whichever half-frame of the smaller picture is to be inserted into the main picture at that time.

Figure 5:
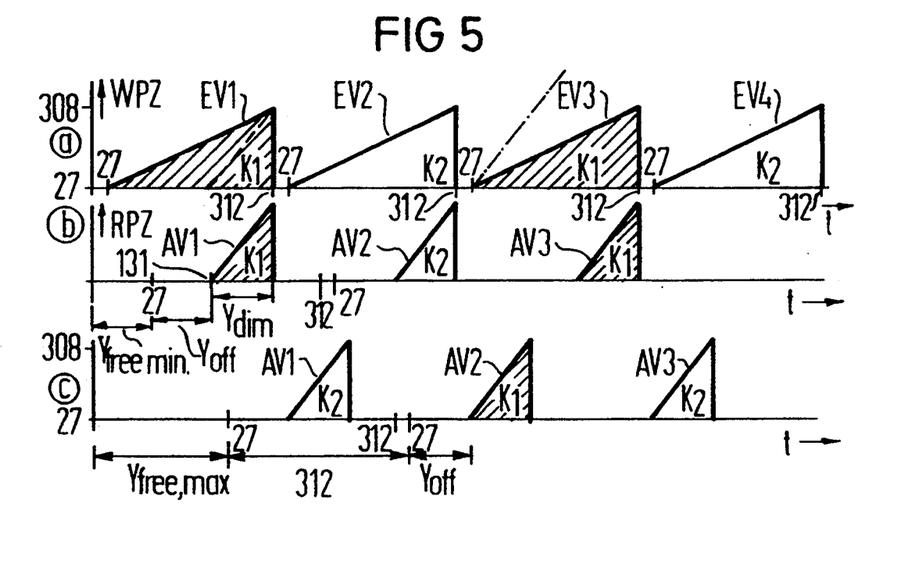
FIG. 5 is a view of line index diagrams for determining an enable signal that is necessary for the decision device.

In conjunction with FIG. 5 it is shown which peripheral conditions are to be placed on the location for the instant of evaluation $Y_{free}$, in order to the enable the joint-line-free insertion of the small picture. $Y_{free}$ should be placed in such a way that there is no overlap of the write-in or inscription vectors EV1, EV2, EV3 and EV4 and the readout vectors AV1, AV2, AV3 for a memory region SP1 or SP2. The limit cases shown in portions b and c of FIG. 5 thus apply for the evaluation instant $Y_{free}$. The portion a of FIG. 5 again shows the write-in or inscription vectors EV1, EV2, EV3 and EV4.

In the portion b of FIG. 5, the temporal condition for the earliest possible joint-line-free readout of an odd half-frame $K_1$ from the first memory region SP1 is shown. As the phantom line in the portion a of FIG. 5 shows, the first write-in or inscription vector EV1 stops just short of intersecting with the first readout vector AV1, while the portion c of FIG. 5 shows the temporal conditions for the latest possible joint-line-free readout of a previously memorized odd half-frame $K_1$ from the first memory region SP1 (in comparison with the phantom line in the portion a of FIG. 5).

As is clearly shown in the portions b and c of FIG. 5, the following peripheral conditions accordingly apply for the evaluation instant $Y_{free}$. The earliest possible evaluation instant $Y_{free,min}$ is determined by the following relationship:

$$Y_{free,min} + Y_{off} + Y_{dim} > 312$$

and the latest possible evaluation instant $Y_{free,max}$ is determined by $$Y_{free,max} + 312 + Y_{off} < 624.$$

The instant of evaluation $Y_{free}$ must accordingly be located between the following two ranges:

$$312 - Y_{off} - Y_{dim} < Y_{free} < 312 - Y_{off}.$$

If it is assumed, for instance, that the small picture is to be less than the main picture by the factor 3 and thus should be 94 lines high, in a main picture having 282 lines, or in other words if $Y_{dim} = 94$, then as a function of the particular location $Y_{off}$ of the small picture to be inserted at that time, the following table applies:

| $Y_{off}$ | $Y_{free, min}$ | $Y_{free, max}$ | $Y_{free}$ |
|---|---|---|---|
| 0 ... 63 | 155 ... 218 | 249 ... 312 | 218 ... 249 → 240 |
| 64 ... 127 | 91 ... 154 | 185 ... 248 | 154 ... 185 → 176 |
| 128 ... 183 | 35 ... 90 | 129 ... 184 | 90 ... 129 → 112 |
| 184 ... 255 | ... 34 | 57 ... 128 | 34 ... 57 → 48 |

As can also be learned from this table, a total of four different enable instants suffice for small pictures of this size, these being given as $Y_{free} = 240, 176, 112$ and 48 by way of example herein, depending upon where the small picture is to be inserted into the main picture. If decoding is performed according to this table in the enable instant detector FZ of FIG. 3, then the most significant two binary places of $Y_{off}$ are sufficient for programming the enable instant detector FZ for generating the enable signal $TY_{free}$.

Figure 6:
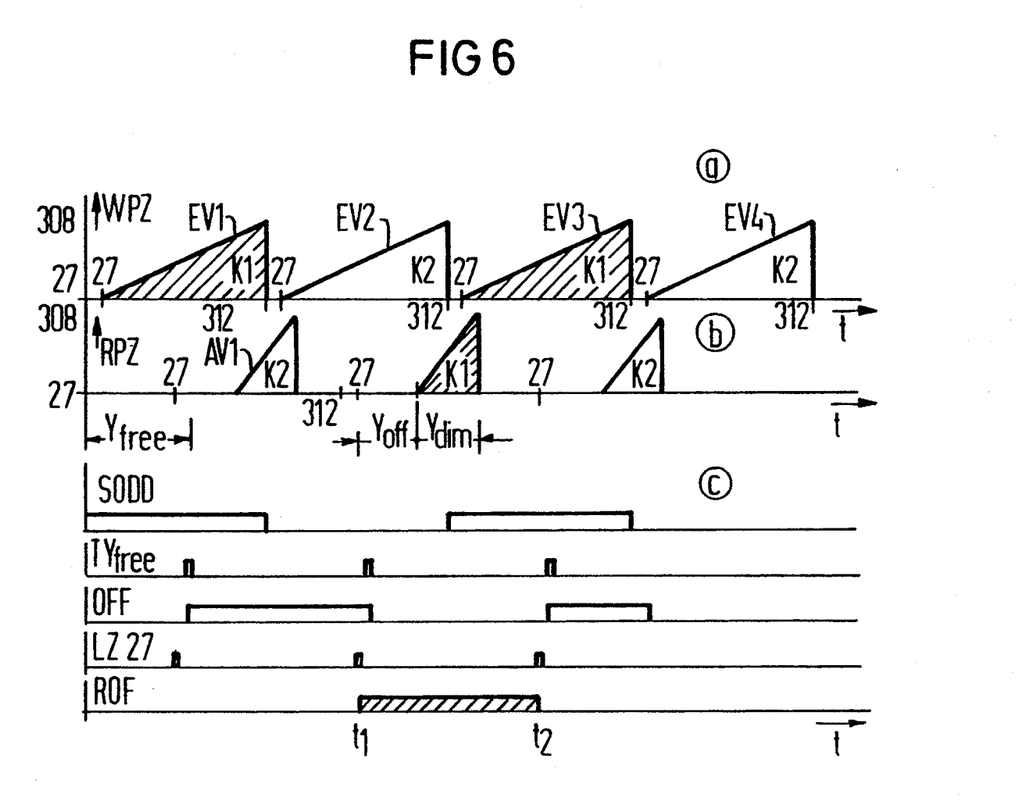
FIG. 6 is a view of a second exemplary embodiment of line index diagrams with readout and write-in or inscription vectors.

In FIG. 6, the method according to the invention is illustrated in terms of a further example. A portion a of FIG. 6 again shows the write-in or inscription vectors EV1, EV2, EV3 and EV4, which represent the write-in, inscription or entry of the odd and even half-frames $K_1$, $K_2$ of the small picture into the first and second memory regions SP1, SP2. The temporal conditions for readout of these stored half-frames $K_1$, $K_2$ are found in a portion b of FIG. 6. Once again, the dimension of the small picture is $Y_{dim} = 94$, and the small picture is intended to be inserted, beginning with its first line, from the 104th line of the main picture, that is $Y_{off} = 104$. In accordance with the above table, $Y_{free} = 176$ applies for the evaluation instant $Y_{free}$ (in FIG. 4, $Y_{free}$ was also 176). The enable instant detector FZ thus generates an enable signal $TY_{free}$ that has a pulse upon the write-in or inscription of the 176th line into the first or second memory region SP1, SP2. The signal courses belonging to the decision device EE can be found in the portion c of FIG. 6. The signal SODD, which indicates whether an even or odd half-frame $K_1$, $K_2$ is written into one of the memory regions SP1, SP2, has a period duration of 40 ms, which changes its polarity every 20 ms. Sampling of the signal SODD at the instant defined by the enable signal $TY_{free}$ produces the signal OFF, again having a period duration of 40 ms which changes its polarity every 20 ms, upon the appearance of the pulse of the enable signal $TY_{free}$. The thus-obtained signal OFF is used as a decision criterion for the readout from the first or second memory region SP1, SP2. This is accomplished by sampling the signal OFF with the signal LZ 27, which defines the beginning of a half-frame in the main picture. The signal LZ 27 is generated in the detector device DE2 from a read frame counter running in synchronism with the main picture. To this end, the detector device DE2 is supplied with synchronizing signals, in this case the vertical synchronizing signal and horizontal synchronizing signal of the first video source Q1. The sampling of the signal OFF at the time determined by the appearance of the pulses of the signal LZ 27 finally leads to the desired decision signal ROF, which decides from which of the two memory regions SP1 or SP2 a readout must be performed, in order to enable the necessary joint-line-free insertion of the small picture into the main picture. The decision signal ROF is synchronous with the read frame and it changes its polarity at the beginning of the line 27 of a half-frame of the main picture. In the portion $c$ of FIG. 6, at a time $t_1$, or in other words at the beginning of the line 27 in the main picture, it is already definite that the first memory region SP1 must be read out for joint-line-free insertion, because from then on the decision signal ROF=1 applies. From a time $t_2$ on, reading must take place from the second memory region SP2 in which, by convention, an even half-frame $K_2$ is stored.

In the method for picture-in-picture insertion described thus far, the decision signal ROF decides from which of the two memory regions the previously stored half-frame must be read out, regardless of whether the stored half-frame is an odd or even half-frame. If coincidentally an even half-frame of the small picture is inserted into an even half-frame of the main picture, or an odd half-frame of the small picture is inserted into an odd half-frame of the main picture, then no further problems arise. If, on the other hand, the decision signal ROF provides for insertion of an even half-frame $K_2$ of the small picture into an odd half-frame $H_1$ of the main picture, or of an odd half-frame $K_1$ into an even half-frame $H_2$ of the main picture, then if corrective provisions are not made beforehand, interlace inversions occur, causing an undesirable scrambling of the picture. This kind of small picture interference, which is also called misinterlacing of the small picture, is naturally undesirable. The problem of interlace inversion will become clear from FIGS. 7, 8, 9 and 10, which will be described below. For the sake of simplicity, instead of the usual 625 picture lines of a main picture, only 19 picture lines are shown, and correspondingly fewer picture lines for the small picture K are also shown.

Figure 7:
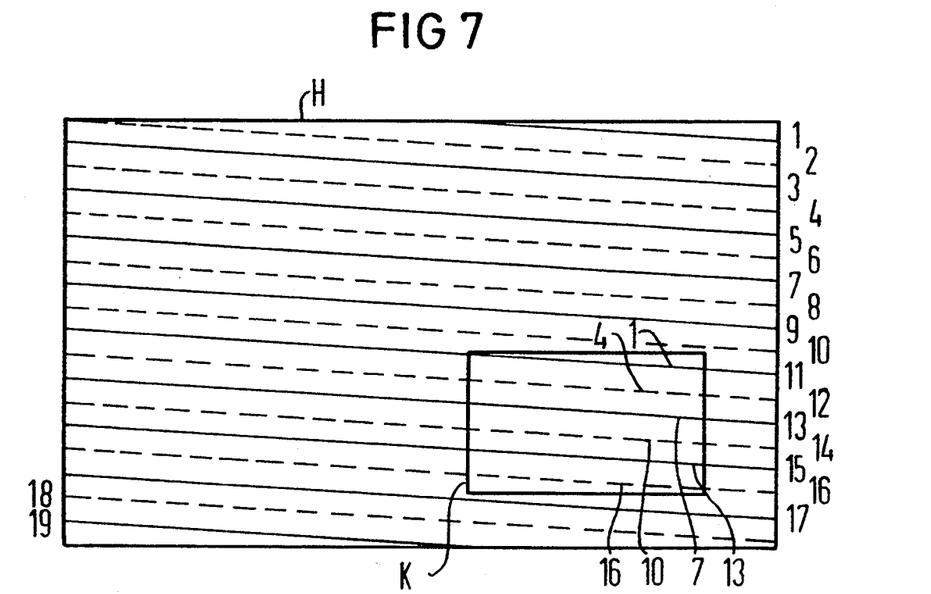
FIG. 7 is an elevational view of a screen with a small picture that has no interlace inversion and is inserted into a main picture.

FIG. 7 shows how correct interlacing of the small picture K permits a small picture reduced by a factor of three to be inserted with its odd lines 1, 7 and 13 into the odd half-frame of the main picture H in lines 1, 3 and 5, and so forth. The small picture is inserted by its even lines 4, 10 and 16 into the even half-frame of the main picture H at lines 2, 4, 6, and so forth.

Figure 8:
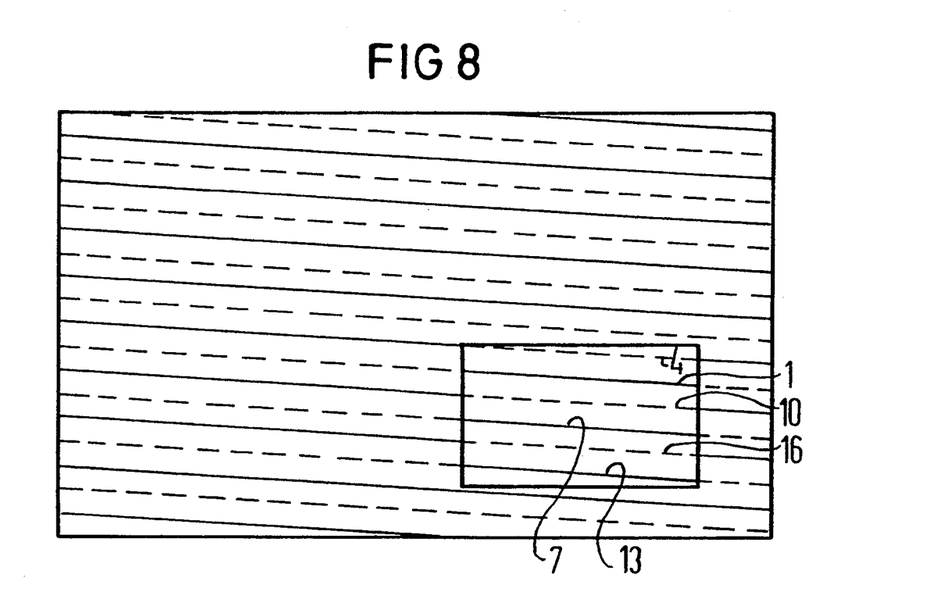
FIG. 8 is a view of a screen according to FIG. 7, but with an interlace inversion in the small picture.

In contrast, if it happens that an odd half-frame $K_1$ of the small picture K is inserted by its lines 1, 7 and 13 into the half-frame $H_2$ of the main picture H at the even lines, and the even half-frame $K_2$ of the small picture K is inserted by its lines 4, 10, 16 into the odd half-frame of the main picture H, then the small picture K will be displayed with wrong interlacing, as seen in FIG. 8. The result is scrambling of the small picture, which is symbolized clearly by a diagonal line in the small picture. In that case, according to a further feature of the invention, a line correction in the small picture is carried out, in the correction device KE that was already described in conjunction with FIG. 1.

The correction device KE is suitable for supplying the decision device EE with not only an odd half-frame $K_1$ of the small picture K, which is intended for insertion into an odd or even half-frame $H_1$, $H_2$ of the main picture H, but also an even half-frame $H_2$ of the small picture K that is intended for insertion into an even half-frame $H_2$ of the main picture H, in an unchanged form, to the decision device EE, and for supplying an even half-frame $K_2$ of the small picture K that is intended for insertion into an odd half-frame $H_1$ of the main picture to the decision device EE in such a form that it is offset downward by one half-frame line. The small picture K with interlace correction then has the line order shown in FIG. 10.

Figure 9:
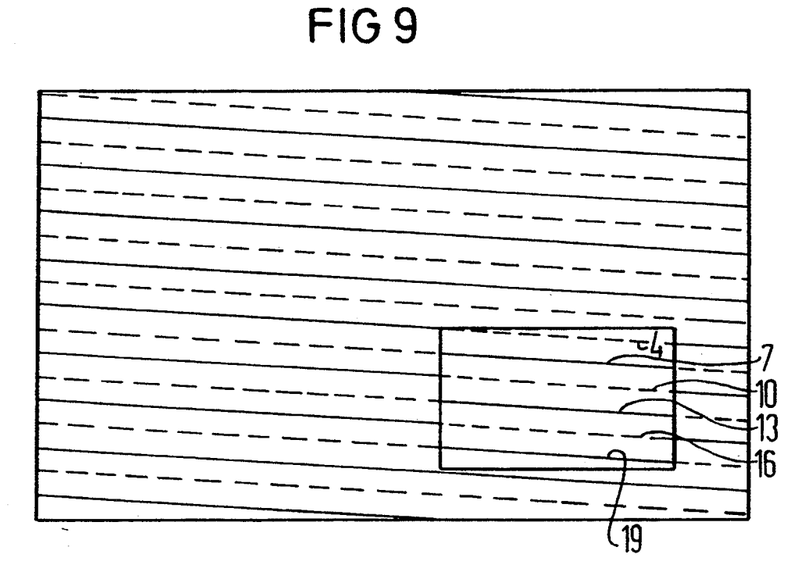
FIG. 9 is a view of a screen as in FIG. 8, in which the interlace inversion in the small picture is corrected by an odd half frame shifted upward by one picture line.
Figure 10:
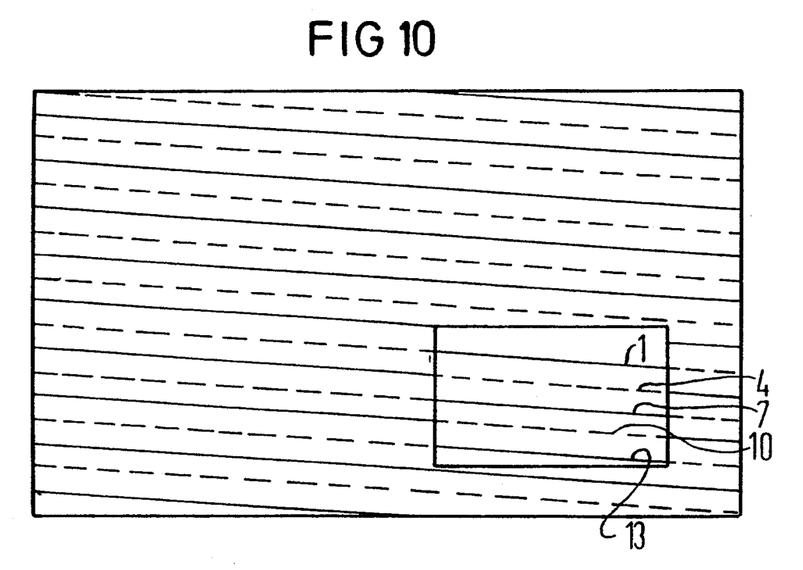
FIG. 10 is a view of a screen as in FIG. 8, in which the interlace inversion in the small picture has been corrected by an even half-frame offset downward by one picture line.

However, it is equally possible for the correction device KE to be suitable for supplying the decision device EE with not only an even half-frame $K_2$ of the small picture K, which is intended for insertion into an odd or even half-frame $H_1$, $H_2$ of the main picture H, but also an odd half-frame $H_1$ of the small picture K, which is intended for insertion into an odd half-frame $H_1$ of the main picture H, in an unchanged form, and an odd half-frame $K_1$ of the small picture K, which is intended for insertion into an even half-frame $H_2$ of the main picture H, in a manner that is offset upward by one half-frame line. This kind of small picture with interlace correction is shown in FIG. 9.

With the method according to the invention as described thus far and the associated apparatus, distortion-free small-picture insertion into a main picture is accordingly possible. According to the invention, there is no joint line JL in the inserted small picture. Since the video signal source furnishes video signals by the interlacing method in this exemplary embodiment, a correction device KE that was capable of correcting line scrambling was necessary.

Figure 11:
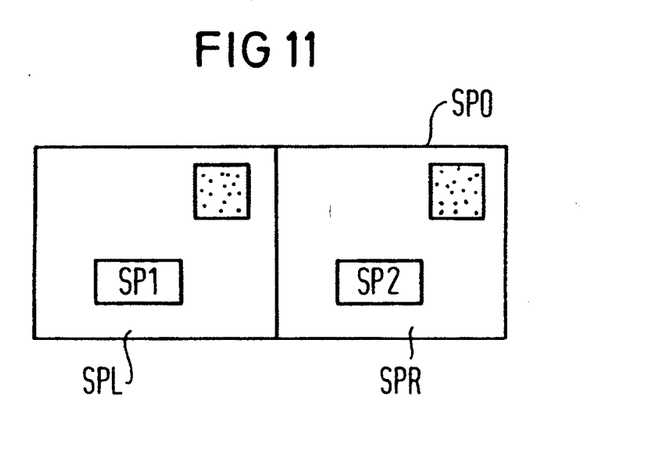
FIG. 11 is a block diagram of a memory apparatus for one entire half-frame of the main picture with a first memory part for storing the picture data provided for the left half of the picture, and a second memory part for storing the picture data provided for the right half of the picture.

As shown in FIG. 11, according to a further feature of the invention, the memory device can store more than two small pictures, and in particular it has a memory region that is suitable for storing one entire main picture or one half-frame of the main picture. The capacity of the memory device can, for instance, be selected in such a way that 288 lines times 270 picture elements (pixels) can be stored, and thus one entire half-frame of the main picture. According to the invention, the first memory region SP1 is located in a memory portion SPL of a memory device SPO that is intended for the left half of the picture, and the second memory region SP2 is located in a memory portion SPR provided for the right half of the picture. An advantage of this structure is that with the synchronizing frame of the main picture, synchronous readout of the entire memory device and thus simple inset-picture or picture-in-picture insertion can be performed. Furthermore, insertion of the small picture can be accomplished by means of marking identifications written into the memory device SPO, as has been proposed in principle in Published European Patent Application No. 0 357 813 A1, which discloses a picture memory device having video signals of a first picture, which could be a small picture, for example. According to a particular embodiment of that device, the picture memory device is suited for storing a second picture, for example a large picture. The video signal data of the first picture are written into a certain subregion of the picture memory device, for instance by setting one or more identifying markers simultaneously in the process. The stored video signal data of the first picture are subsequently read out synchronously with the second picture. As stated therein, it has been shown to be particularly advantageous to write the identifying markers for each pixel, or for pixel groups composed of a plurality of pixels, for example, into an unused bit matrix of the video memory device. If the storage spaces of the picture memory device are organized with an 8-bit value width, for example, and if the first seven bits are reserved for the video signal data, then the eighth, unused bit matrix can be used for writing in the marker, for example a logical 1, as the enabling indicator for displaying a pixel which has been written in. With the method disclosed therein, it is possible to display any arbitrarily shaped part of an image as a small picture inside the large picture. To do so, all that is required is to set the markers appropriately.

The prerequisite for this is that in the horizontal direction, the small picture to be inserted is read out of either one memory part SPL or the other memory part SPR and displayed. The selection of the correct memory region SP1 or SP2 is again made by means of the decision signal ROF.

With this kind of memory device it is possible to store not only a moving small picture but also other small pictures that are still pictures in the memory device and to display them. In the simplest case, these small pictures are likewise displayed with the vertical resolution of two half-frames. To this end, the small pictures belonging to a video signal source are read out in alternation in the first and second memory region, with readout of the entire applicable memory portion. However, this requires that a decision be made prior to the readout of the memory device as to which of the memory regions SP1 or SP2 should be active. In FIG. 11, the memory region for a small picture with non-moving picture contents is shaded with dots.

According to another feature of the invention it is provided that the main picture and the small picture to be inserted into the main picture are displayed at a frame repetition frequency or half-frame repetition frequency which is twice the original frame or half-frame repetition frequency. With twice the frame repetition frequency of approximately 100 Hz, the television picture can be made non-flickering.

Depending on the scanning order of the main picture, in other words whether it is AABB or ABAB, where A and B indicate the scanning location of a frame or half-frame (A=even half-frame, B=odd half-frame), an identification signal DODD is generated according to the invention in order to indicate the instantaneous scanning location of the main picture, and a scanning correction signal KORR is generated as a function thereof. The scanning correction signal KORR then trips a scanning correction of the assigned memory region from which the half-frame is to be read out.

Figure 12:
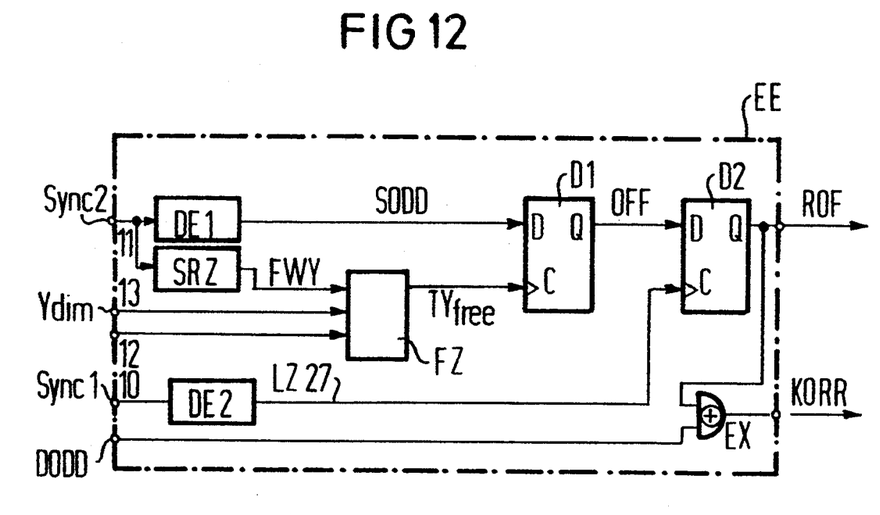
FIG. 12 is a detailed schematic and block circuit diagram of a configuration of a decision device for a picture-in-picture insertion, having twice the frame repetition frequency or half-frame repetition frequency as compared with the original frame or half-frame repetition frequency.

In order to assure the picture-in-picture insertion even at twice the half-frame or frame repetition rate, the decision device EE already introduced in FIG. 3 is modified in accordance with the circuit of FIG. 12.

An EXCLUSIVE OR gate EX is additionally provided in the decision device EE of FIG. 12, and the correction signal KORR can be picked up at an output terminal thereof. This correction signal KORR trips a scanning correction, in the half-frame to be read out of the selected memory region. Both the decision signal ROF and the identification signal DODD for identifying the instantaneous scanning location of the main picture are present at two inputs of the EXCLUSIVE OR gate.

The method according to the invention for picture-in-picture insertion at twice the half-frame or frame repetition frequency will be described in further detail below in conjunction with FIGS. 13 and 14. Once again, line index diagrams are shown for writing, inscribing or entering and reading out the half-frames of the small picture, along with the signal courses pertaining to the decision device of FIG. 12.

Figure 13:
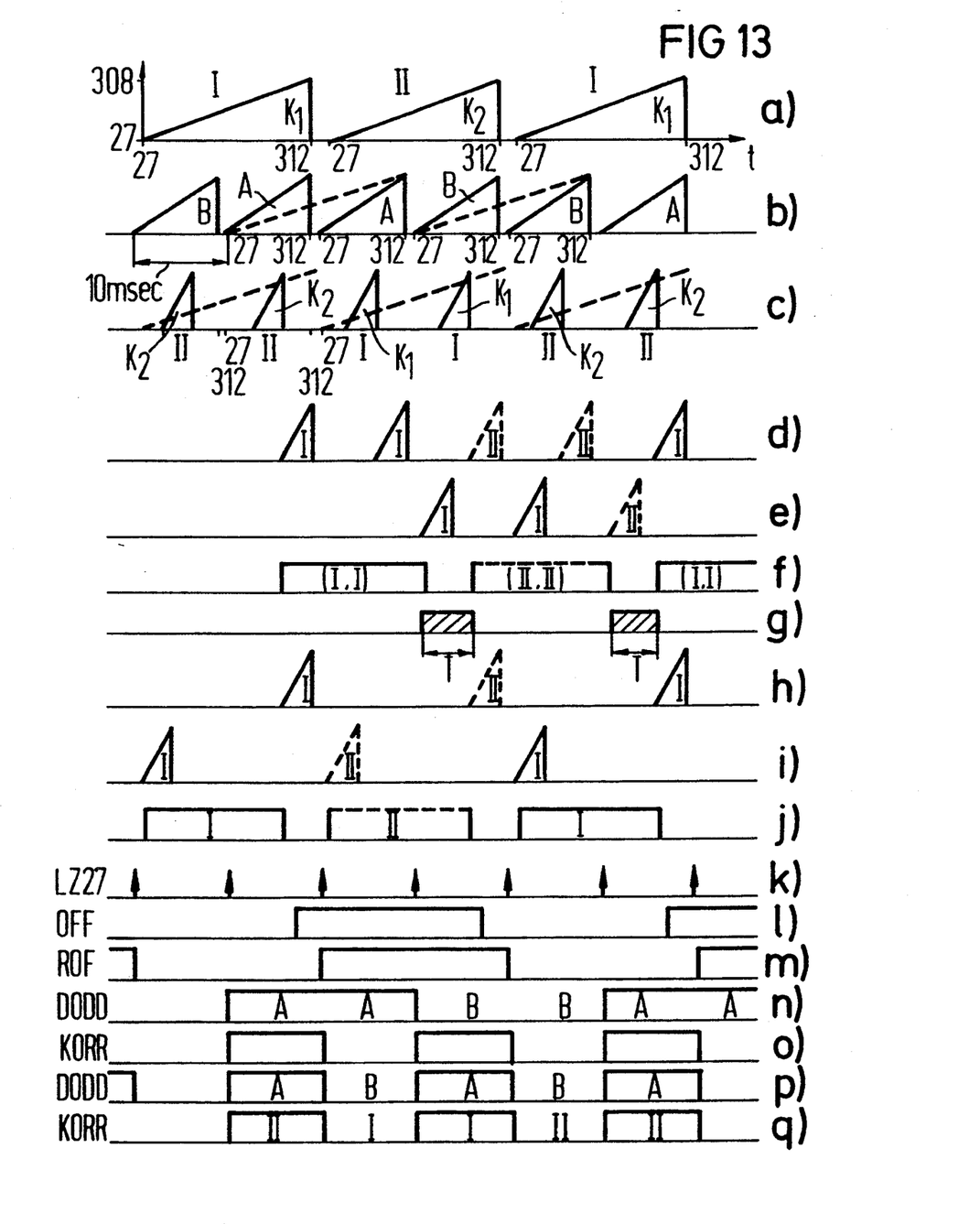
FIG. 13 is a view of line index diagrams providing a basic illustration of the method according to the invention with scanning correction in a picture-in-picture insertion with double the frame or half-frame repetition frequency.

In FIG. 13, the method according to the invention is shown with picture-in-picture insertion at twice the frame repetition frequency, in other words ABAB, or twice the half-frame repetition frequency AABB. The peripheral conditions for the earliest possible and latest possible readout of the half-frames of the small picture stored in the first or second memory region are again shown from line index diagrams, and the time zones in which the readout from the first or second memory region is not allowed, can be seen as a function thereof. The furnishing of both the correction signal KORR and the decision signal ROF will be described below from the signal courses in the decision device of FIG. 12.

Regarding FIG. 13 in detail: a portion a of FIG. 13 again shows the write-in or inscription vectors, which identify the write-in, inscription or entry of the half-frames $K_1$, $K_2$ of the small picture into the first and second memory regions. The time in line numbers of the small picture is again plotted on the abscissa, while the ordinate shows the line that is just then being written in one of the two memory regions. It is assumed in the portion a of FIG. 13 that first an odd half-frame $K_1$ of the small picture is written into the first memory region, which is indicated as I, and then an even half-frame $K_2$ is written in a second memory region II, followed by a subsequent odd half-frame $K_1$ in the first memory region II, and so forth.

A portion b of FIG. 13 shows the readout vectors for a main picture that is to be displayed at twice the frame repetition frequency, thus with the scanning locations AABB (A=odd half-frame, B=even half-frame). Broken straight lines in the portion b of FIG. 13 indicate conditions for a single (undoubled) half-frame frequency. In terms of readout vectors again, in order to double the half-frame repetition frequency (and to double the frame repetition frequency), it is clear that a picture memory must be provided for the main picture, from which the main picture must be read out twice, at twice the readout speed, by comparison with the write-in or inscription speed. Since the video sources for the small picture and main picture are independent of one another, the phase difference already mentioned above in the synchronous locations of the main picture and small picture occurs.

A portion c of FIG. 13 shows the temporal conditions for the readout of the half-frames of the small picture that are stored in the two memory regions I, II, if it is again assumed that the small picture is 94 lines high and is to be inserted beginning with the 104th line of the main picture. Once again, the condition for the joint-line insertion of the small picture into the main picture is that the readout vectors and write-in or inscription vectors of one memory region not be allowed to overlap. As is clearly shown in a portion c of FIG. 13 in combination with the write-in or inscription vectors taken from the portion a of FIG. 13 and shown in broken lines, initially it is accordingly necessary for the even half-frame $K_2$ stored in the second memory region II to be read out twice. Next, the odd half-frame $K_1$ must be read out of the first memory region I twice. Subsequently, the next even half-frame $K_2$ is read out of the second memory region II twice.

As a comparison of the portions b and c of FIG. 13 shows, the problem which arises is that the second even half-frame $K_2$ read out of the small picture is intended for insertion into a first odd half-frame A of the main picture, the first odd half-frame K₁ of the small picture is intended for insertion into a second odd half-frame A, the second odd half-frame K₁ of the small picture is intended for insertion into an even half-frame B of the main picture following the second odd half-frame A, and so forth.

In order to assure correctly scanned picture-in-picture insertion, it is accordingly necessary, in the exemplary embodiment of FIG. 13, to transform the odd half-frames K₁ read out for the second time from the first memory region I into a scanning location B, or in other words into an even half-frame, and to transform an even half-frame K₂ read out for the second time for the second memory region II into a scanning location A, or in other words into an odd half-frame. Ideally, this transformation would be carried out by means of a 180° phase displacement, for example by means of an all-pass. However, for reasons of expense, a linear or non-linear low-order filtration will be provided, such as a linear interpolation of pixels located one above the other.

Figure 14:
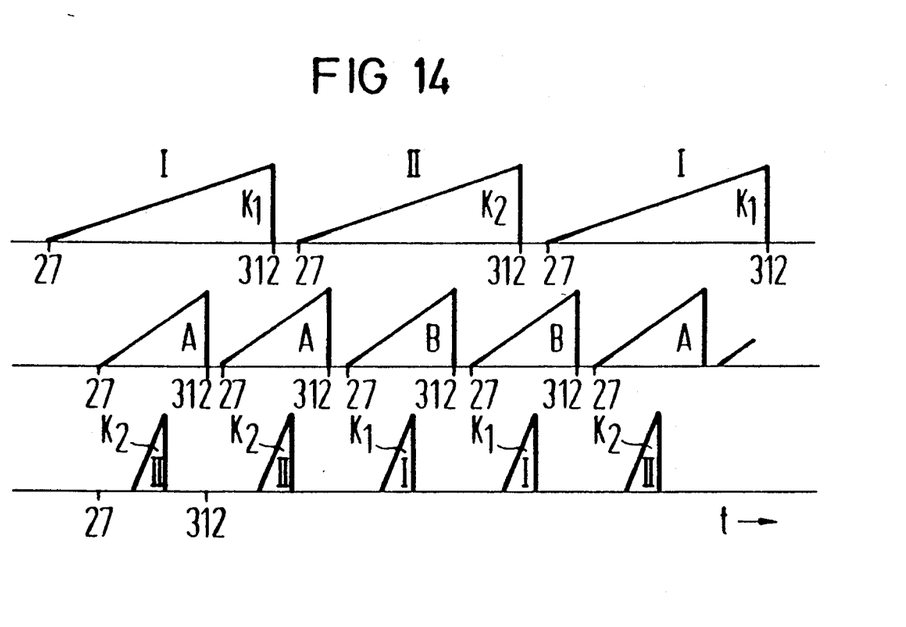
FIG. 14 is a view of line index diagrams providing a basic illustration of the method according to the invention in a picture-in-picture insertion with double the frame or half-frame repetition frequency.

On the other hand, if the main picture and the small picture have synchronous positions shown in FIG. 14, then a situation arises which is that the aforementioned transformation is unnecessary. There, the half-frames read out of the memory regions I and II already have the correct scanning position.

It is therefore necessary to generate a signal that indicates whether or not a scanning correction in the half-frame in the small picture to be inserted is necessary. In order to be capable of generating this kind of correction signal, the peripheral conditions for the earliest and latest possible readout of a pair of half-frames must be known. A portion $d$ of FIG. 13 shows the temporal conditions for the earliest possible readout of the pair of half-frames K₁, K₁ or K₂, K₂ from the memory regions I and II, and a portion $e$ of FIG. 13 shows the latest possible instant. Once again, the peripheral conditions are dictated by the demand for freedom from joint lines (on this point, reference is made to the portion $a$ of FIG. 13 in combination with a portion $d$ of FIG. 13 or a portion $e$ of FIG. 13). These two peripheral conditions result in the regions shown in a portion $f$ of FIG. 13, in which the stored half-frames of the small picture may be read out in pairs from the first memory region I and the second memory region II, but periods of time T do occur in which enabling of half-frames for readout cannot be allowed from either the first or the second memory region. In these time zones T, picture-in-picture insertion by correction of the scanning position accordingly does not work.

Portions $h$ and $i$ of FIG. 13 show the earliest and latest possible periods of time in which the respective memory regions I and II may be read out, but without the condition of the readout of pairs of half-frames as in the portions d and e of FIGS. 13. A portion $j$ of FIG. 13 shows the periods of time in which starting of reading from the first or second memory region I or II is not permitted. The portion $j$ of FIG. 13 shows that in principle it must always be possible to read out from the first memory region I or the second memory region II. A comparison of the portions $f$ and $j$ of FIGS. 13 shows that neither the method with scanning correction, nor the method introduced in conjunction with FIG. 14 with correct-scanned repetition of the half-frames, can be attained for all of the synchronous positions. According to the invention, it is therefore necessary, depending on the synchronous and scanning location, to switch back and forth between one method (see FIG. 14) without correction of the scanning location, and the other method with scanning correction.

A portion $k$ of FIG. 13 again shows the signal LZ 27, which defines the beginning of the line 27 in the main picture. As has already been discussed in detail in conjunction with FIGS. 4 and 6, the signal OFF and the decision signal ROF are again generated in the decision device EE (see portions $l$ and $m$ of FIG. 13). In addition, the decision device EE of FIG. 11 is supplied with the identification signal DODD, which identifies the instantaneous scanning location of the main picture. The course of this identification signal DODD is shown in a portion $n$ of FIG. 13. Through an EXCLUSIVE OR linkage of the decision signal ROF and the identification signal DODD, the scanning correction signal KORR, which for this exemplary embodiment is shown in a portion $o$ of FIG. 13, is furnished. This scanning correction signal KORR indicates whether or not a scanning correction must be performed for the half-frame K₁, K₂ of the small picture read out from the defined memory region I, II. A correction should be made in the case where the scanning correction signal KORR=1, while at KORR=0, no correction of the scanning location in the read-out half-frame of the small picture should be made. It is readily understood that with a scanning location shifted by 10 ms to the right or left as compared with the portion $b$ of FIG. 13, the correction signal KORR would either always be zero or always be one. In the latter case, instead of a scanning correction by interpolation, scanning correction by modified picture lines would also be possible. Since interpolation is avoided, this would have the advantage of making the picture appear sharper. In contrast, with a 100 Hz half-frame scanning location ABAB, the identification signal DODD alternates at 50 Hz, as shown in a portion $p$ of FIG. 13. Accordingly, the correction signal KORR also alternates at 50 Hz, as shown in a portion $q$ of FIG. 13. This means that in this operating mode, every other half-frame of the small picture should always be corrected with interpolation or modified picture lines.

With the method introduced herein according to the invention for picture-in-picture insertion, with twice the frame or half-frame repetition frequency as compared with the original frame or half-frame repetition frequency, a total of two memory regions suffices. The picture-in-picture insertion is free of joint lines, in accordance with the prerequisite. Moreover, the insertion of the small picture is performed at the correct time. In other words, no scrambling of motion occurs in the small picture.

It has therefore been found that the method according to the invention is also ideally usable for picture-in-picture insertion at twice the frame rate or twice the half-frame repetition frequency.

I claim:

1. In a method for picture-in-picture insertion in which a small picture having successive frames is to be inserted into a main picture having successive frames, the improvement which comprises:

alternatingly writing the successive frames of the small picture frame-wise into a first memory region and a second memory region of a memory device, generating a decision signal at a beginning of a display of the main picture, for deciding from which of the first and second memory regions a stored frame of the small picture is to be read out, and generating the decision signal as a function of synchronizing signals of the small picture and the main picture, and as a function of a location of the small picture in the main picture, and reading out successive frames of the small picture from whichever memory region enables joint-line-free insertion of the small picture into the main picture.

2. The method according to claim 1, which comprises determining the beginning of the display of the main picture by the beginning of a first picture line visible on a screen.

3. The method according to claim 1, which comprises generating the decision signal as a function of a signal being dependent on a size of the small picture to be inserted.

4. The method according to claim 1, which comprises carrying out a line correction in the small picture if an interlace inversion occurs in the small picture to be inserted.

5. The method according to claim 1, which comprises dividing the successive frames of the small picture and the main picture into odd and even half-frames.

6. The method according to claim 1, which comprises displaying the small picture and the main picture at a frame repetition frequency being twice that of an original frame repetition frequency, predetermining a frame scanning order for the main picture, generating an identification signal for generating an instantaneous scanning location of the main picture and generating a scanning correction signal as a function thereof, and tripping a scanning correction for a frame to be read out from the selected memory region with the scanning correction signal.

7. The method according to claim 6, which comprises carrying out the scanning correction of the small picture by interpolation of picture lines.

8. The method according to claim 6, which comprises carrying out the scanning correction of the small picture by displacement of picture lines.

9. An apparatus for picture-in-picture insertion, comprising:
a screen for displaying a main picture and at least one small picture to be inserted into the main picture,
a first video source for displaying the main picture with first frames that succeed one another in alternation and have first synchronizing signals,
a second video source for displaying the small picture with second frames that succeed one another in alternation and have second synchronizing signals,
a memory device having one memory region for write-in of the first frames and another memory region for write-in of the second frames of the small picture,
a write-in device connected to said memory device for writing the successive frames of the small picture into said memory regions,
a readout device connected to said memory device for reading out the frames of the small picture stored in said memory regions,
an inserting device connected between said memory device and said screen for joint-line-free insertion of the frames to be read out of the small picture into the main picture, and
a decision device connected to said readout device for generating a decision signal to be supplied to said readout device for deciding at a beginning of a display of the main picture from which of said memory regions a stored frame of the small picture for insertion into the main picture is to be read out, said decision device having a first input terminal for receiving the synchronizing signal of the main picture, a second input terminal for receiving the synchronizing signal of the small picture, a third input terminal for receiving a signal indicating a location of the small picture in the main picture, a detector device connected to said first input terminal and having an output for supplying a detector signal indicating a beginning of a first picture line of the main picture being visible on said screen, and a logic array connected to the output of said detector device and said second and third input terminals for furnishing the decision signal as a function of the detector signal.

10. The apparatus according to claim 9, wherein said logic array includes first and second D flip-flops each having a data input, a clock input and a Q output,
the data input of said first D flip-flop receives a signal indicating whether a frame of the small picture having been just written into said memory device is a first or a second frame, based on the signal from said second input terminal,
the clock input of said first D flip-flop receives a predeterminable enable signal being generated as a function of the location of the small picture to be inserted into the main picture, based on the signal from said third input terminal,
the Q output of said first D flip-flop is connected to the data input of said second D flip-flop,
the clock input of said second D flip-flop receives the detector signal, and
the Q output of said second D flip-flop supplies the decision signal.

11. The apparatus according to claim 10, wherein said decision device has an enable instant decoder connected to the clock input of said first D flip-flop for generating and supplying the enable signal, said enable instant decoder having means for furnishing one enable signal for various regions of possible locations of the small picture in the main picture.

12. The apparatus according to claim 9, including a correction device connected between said inserting device and said memory device for correcting interlace inversions arising in the small picture to be inserted.

13. The apparatus according to claim 9, wherein said memory device has a memory region with means for storing more than two small pictures.

14. The apparatus according to claim 9, wherein said memory device has a memory region with means for storing a main picture.

15. An apparatus for picture-in,picture insertion, comprising:
a screen for displaying a main picture and at least one small picture to be inserted into the main picture,
a first video source for displaying the main picture with first frames that succeed one another in alternation and have first synchronizing signals,
a second video source for displaying the small picture with second frames that succeed one another in alternation and have second synchronizing signals,
a memory device having one memory region for write-in „of the first frames and another memory region for write-in of the second frames of the small picture, a write-in device connected to said memory device for writing the successive frames of the small picture into said memory regions, a readout device connected to said memory device for reading out the frames of the small picture stored in said memory regions, an inserting device connected between said memory device and said screen for joint-line-free insertion of the frame to be read out of the small picture into the main picture, a decision device connected to said readout device for generating a decision signal to be supplied to said readout device for deciding at a beginning of a display of the main picture from which of said memory regions a stored frame of the small picture for insertion into the main picture is to be read out, and a correction device connected between said inserting device and said memory device for correcting interlace inversions arising in the small picture to be inserted, said correction device having means for supplying said decision device with:

a first frame of the small picture being intended for insertion into a first or second frame of the main picture, and a second frame of the small picture being intended for insertion into a second frame of the main picture in unchanged form, and a second frame of the small picture being intended for insertion into a first frame of the main picture in a form being offset downward by one picture line.

16. An apparatus for picture-in-picture insertion, comprising:

a screen for displaying a main picture and at least one small picture to be inserted into the main picture, a first video source for displaying the main picture with first frames that succeed one another in alternation and have first synchronizing signals, a second video source for displaying the small picture with second frames that succeed one another in alternation and have second synchronizing signals, a memory device having one memory region for write-in of the first frames and another memory region for write-in of the second frame of the small picture, a write-in device connected to said memory device for writing the successive frames of the small picture into said memory regions, a readout device connected to said memory device for reading out the frames of the small picture stored in said memory regions, an inserting device connected between said memory device and said screen for joint-line-free insertion of the frames to be read out of the small picture into the main picture, a decision device connected to said readout device for generating a decision signal to be supplied to said readout device for deciding at a beginning of a display of the main picture from which of said memory regions a stored frame of the small picture for insertion into the main picture is to be read out, and a correction device connected between said inserting device and said memory device for correcting interlace inversions arising in the small picture to be inserted, said correction device having means for supplying said decision device with:

a second frame of the small picture being intended for insertion into a first or second frame of the main picture, and a first frame of the small picture being intended for insertion into a first frame of the main picture in unchanged form, and a first frame of the small picture being intended for insertion into a second frame of the main picture in a form being offset upward by one-half of a picture line.

17. An apparatus for picture-in-picture insertion, comprising:

a screen for displaying a main picture and at least one small picture to be inserted into the main picture, a first video source for displaying the main picture with first frames that succeed one another in alternation and have first synchronizing signals, a second video source for displaying the small picture with second frames that succeed one another in alternation and have second synchronizing signals, a memory device having one memory region for write-in of the first frames and another memory region for write-in of the second frames of the small picture, a write-in device connected to said memory device for writing the successive frames of the small picture into said memory regions, a readout device connected to said memory device for reading out the frames of the small picture stored in said memory regions, an inserting device connected between said memory device and said screen for joint-line-free insertion of the frames to be read out of the small picture into the main picture, a decision device connected to said readout device for generating a decision signal to be supplied to said readout device for deciding at a beginning of a display of the main picture from which of said memory regions a stored frame of the small picture for insertion into the main picture is to be read out, said memory device having a memory region with means for storing more than two small pictures; and means for writing marking identifications into said memory device for defining the location of said memory region for the small picture inside said memory region for the main picture.

18. An apparatus for picture-in-picture insertion comprising:

a screen for displaying a main picture and at least one small picture to be inserted into the main picture, a first video source for displaying the main picture with first frames that succeed one another in alternation and have first synchronizing signals.

a second video source for displaying the small picture with second frames that succeed one another in alternation and have second synchronizing signals, a memory device having one memory region for write-in of the first frames and another reason for write-in of the second frames of the small picture, a write-in device connected to said memory device for writing the successive frames of the small picture into said memory regions, a readout device connected to said memory device for reading out the frames of the small picture stored in said memory regions, an inserting device connected between said memory device and said screen for joint-line-free insertion of the frames to be read out of the small picture into the main picture, a decision device connected to said readout device for generating a decision signal to be supplied to said readout device for deciding at a beginning of a display of the main picture from which of said memory regions a stored frame of the small picture for insertion into the main picture is to be read out, said memory device having a memory region with means for storing a main picture, and means for writing marking identifications into said memory device for defining the location of said memory region for the small picture inside said memory region for the main picture.

* * * * *